United States Patent [19]

Ohtsuka et al.

[11] Patent Number: 4,550,992

[45] Date of Patent: Nov. 5, 1985

[54] MOTOR DRIVE CONTROL CIRCUIT

[75] Inventors: Masanori Ohtsuka, Kanagawa; Ryuji Tokuda, Tokyo, both of Japan

[73] Assignee: Canon Kabushiki Kaisha, Tokyo, Japan

[21] Appl. No.: 678,668

[22] Filed: Dec. 6, 1984

[51] Int. Cl.[4] .............................................. G03B 1/18
[52] U.S. Cl. ............................................... 354/173.11
[58] Field of Search ................................... 354/173.11

[56] References Cited

U.S. PATENT DOCUMENTS 4,350,422 9/1982 Maida ............................ 354/173.11
4,389,111 6/1983 Uchidoi et al. ................. 354/173.11

Primary Examiner—William B. Perkey

Attorney, Agent, or Firm—Toren, McGeady, Stanger, Goldberg and Kiel

[57] ABSTRACT

A motor drive control circuit for a camera comprises means for comparing a power supply voltage with a predetermined voltage; means for holding information obtained by the comparison; and a timer circuit which causes an output signal to be generated after the lapse of a predetermined period of time. With exception of the time at which the power supply to the motor is started, the power supply voltage obtained during the process of power supply to the motor is compared with the predetermined voltage. The information thus obtained is retained and various control operations are performed on the basis of the information retained.

7 Claims, 4 Drawing Figures

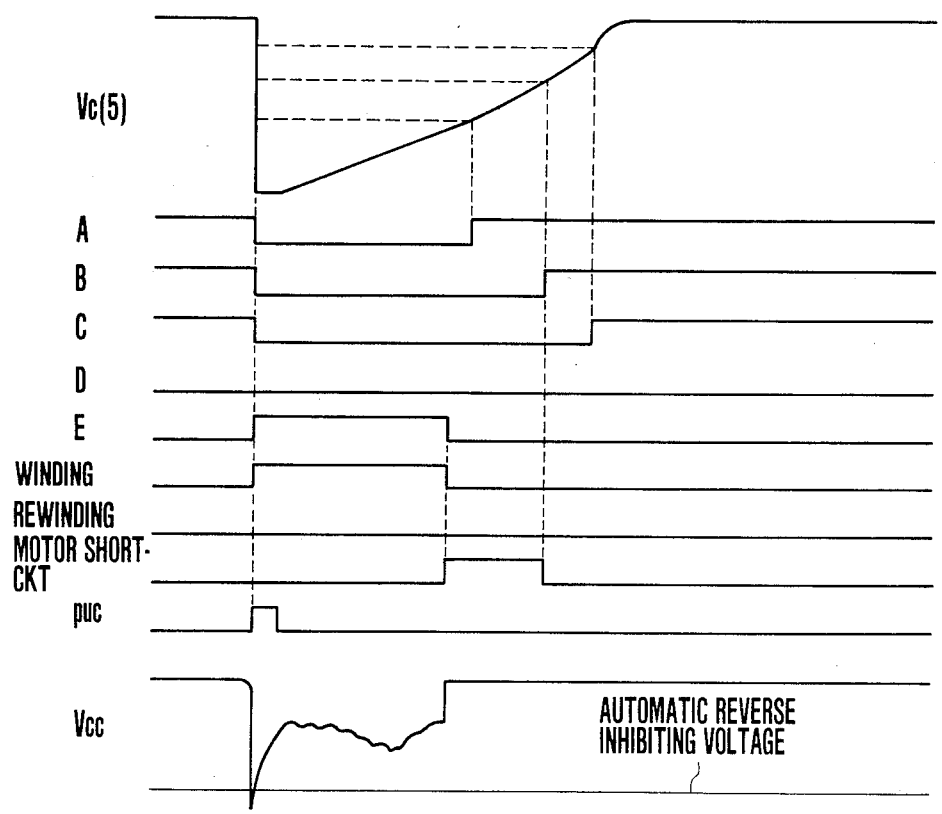

MOTOR DRIVE CONTROL CIRCUIT

BACKGROUND OF THE INVENTION

1. Field of the Invention

This invention relates to a motor driving control circuit suited for a camera and more particularly to a motor drive control circuit which performs a battery check during a motor drive operation and then time serially performs various control operations on the basis of information obtained by the battery check.

2. Description of the Prior Art

Cameras equipped with motor drive devices and especially with film feeding drive devices of the kind having a function called an automatic reversing or automatic returning function to automatically rewind the film when it comes to an end thereof have recently increased in number. In the camera of this kind, however, the film winding power of the motor becomes insufficient when a battery voltage drops. In that event, the on-and-off time intervals of a switch which is arranged to turn on and off at the time of feeding the film become extremely long or, in some case, a film winding process cannot be completed within a predetermined length of time. Then, since a rewinding load is generally lighter than a winding load, the camera might begin to rewind the film. In addition to this, even when the film begins to be automatically rewound after coming to the end thereof, film might come to a stop halfway in the rewinding process to be left in an incompletely rewound state by a drop in the battery voltage.

To avoid these troubles, it is conceivable to check and detect the power supply voltage in some suitable manner and to automatically inhibit film winding or automatic film rewinding, if the voltage thus detected is below a predetermined level. Meanwhile, it is of course preferable, for accurate and maximum use of the battery power, to perform a power supply voltage check under an actual load, in the same manner as in the general technical fields as well as in the field of cameras and, in this case, to perform a battery check during an actual process of power supply to the motor.

However, in accordance with the prior art, a process to be carried out after the power supply voltage is found below a predetermined level (hereinafter referred to as a battery NG state) by a voltage check performed during power supply to a motor have been not always satisfactory. More specifically stated, as shown in an example of the prior art disclosed in Japanese Laid-Open patent application No. Sho 57-151924, the battery voltage rises when power supply to the motor is cut off and this results in an erroneous action with the detected battery NG information inverted by the rise of voltage. To solve this problem, the prior art method necessitates continuation of power supply after detection of the battery NG state. However, the battery which has been found NG is fraught with such possibilities as: The continuation of power supply might cause a liquid leak; and in the event of a battery check performed under a low temperature condition or other battery power lowering conditions, the battery which is determined to be in the NG state might become serviceable again when it is brought back to a normal temperature condition. In such a case, a latent evergy of the battery might completely be consumed by the continued power supply.

Meanwhile, in another example of the prior art disclosed in Japanese Laid-Open patent application No. Sho 58-75135, the power supply voltage is determined by detecting the tension of the film. If the battery is thus found in the NG state, the NG information is stored and then the power supply to the motor is cut off. This method necessitates the use of means for detecting that the motor is stopped by the tension of the film and also use of a complex logic circuit including an oscillator, a counter, etc. In addition to them, the method requires for a practical application the provision of either a back-up power supply or boosting means for keeping these circuit elements operative in the event of a drop in the power supply voltage. Therefore, the circuit arrangement according to the method disclosed becomes complex and expensive.

SUMMARY OF THE INVENTION

It is therefore an object of the present invention to provide a motor drive control circuit which solves the above-stated problems of the prior art methods and is capable of giving accurate battery check information by performing a battery check while a film is on the feeding movement during a predetermined period of time after a film winding process has become stable.

The above and further objects and features of this invention will become apparent from the following detailed description of a specific embodiment thereof taken in connection with the accompanying drawings:

BRIEF DESCRIPTION OF THE DRAWINGS

FIG. 4 is a timing chart showing the operations of various circuit elements of FIG. 1 performed for winding one frame portion of film when the power supply voltage is above the predetermined value.

DETAILED DESCRIPTION OF THE PREFERRED EMBODIMENTS

Figure 1:
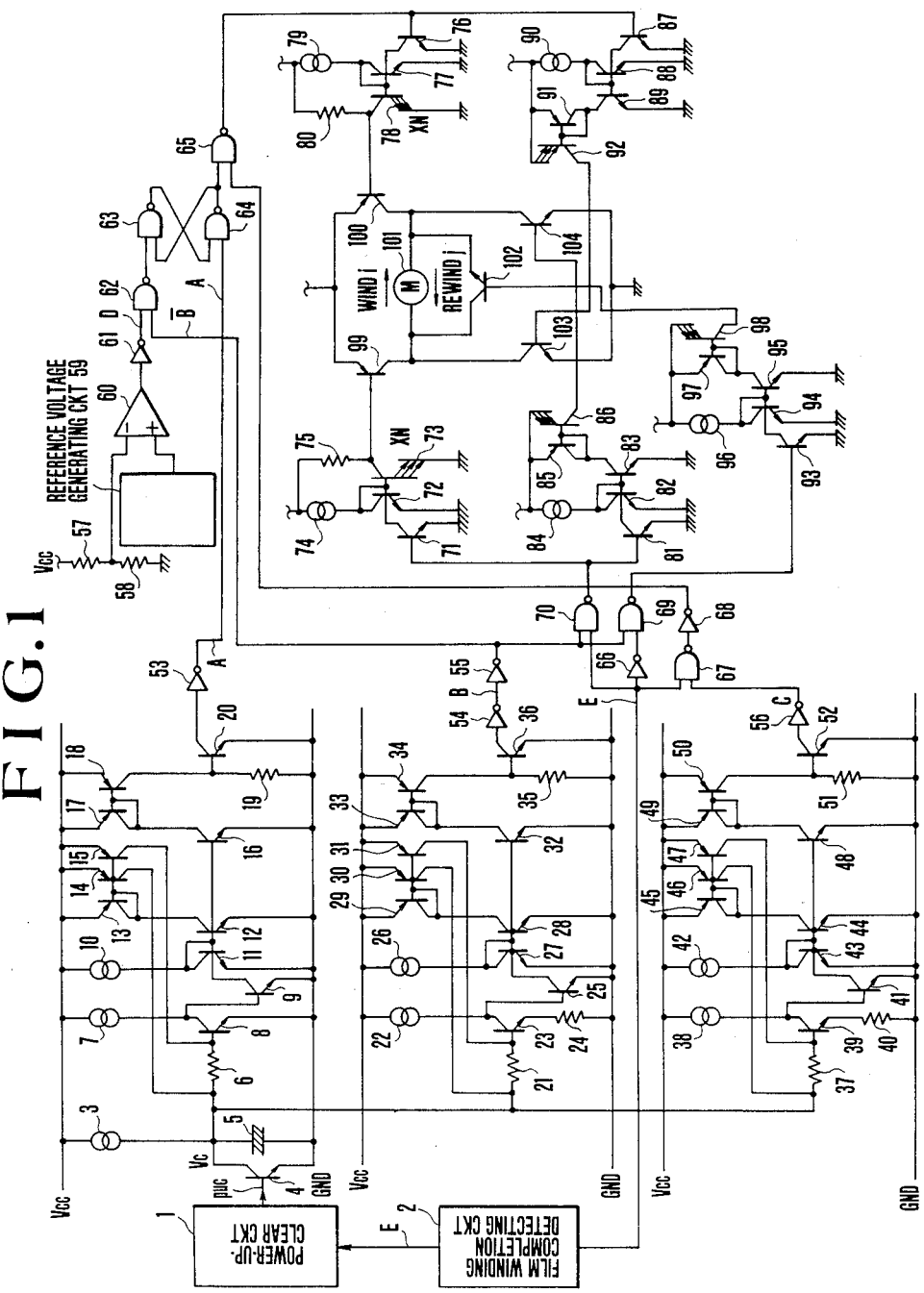
FIG. 1 is a circuit diagram showing, as an embodiment of this invention, the electrical circuit arrangement of a film feeding control circuit.

An embodiment of this invention is described with reference to the accompanying drawings as follows: FIG. 1 shows a circuit arrangement for controlling a motor 101 which operates to wind and rewind a film (not shown). As shown on the middle right-hand side of the drawing, the film is wound when a current "i" flows to the motor 101 in the right direction and is rewound when a current "j" flows in the left direction. A film winding completion detecting circuit 2 which is shown on the middle left-hand side of the drawing is arranged to detect whether a film winding process has completed or not completed and to produce a low level signal when it is completed and a high level signal if it is not completed. A power-up-clear circuit 1 is arranged to produce a signal PUC (will be described later) at the beginning of film winding in response to the signal from the film winding completion detecting circuit 2. The signal PUC is applied to a transistor 4. A constant current source 3 which is shown on the upper left-hand side of the drawing is arranged to charge a capacitor 5 with the transistor 4 turned off after the signal PUC is produced. A resistor 6 serves as the base resistor for a transistor 8 and is arranged to limit the flow of a current from the constant current source 3 to the transistor 8 when the voltage Vc of the capacitor 5 rises. The constant current source 7 supplies a base current to a transistor 9 when the voltage Vc is at a low level and a collector current to the transistor 8 when the voltage Vc is at a high level. With the base current supplied, the transistor 8 is turned on to supply its collector current. The transistor 8 is arranged to produce a first timing signal A which will be described later. Assuming that the current flowing through a resistor 6 is I6, the current of the constant current source 7 is I7, a voltage between the base and emitter of the transistor 8 is VBE and, since VBE is a function of I6 and I7, they are expressed as VBE[I6 +I7], the threshold level Vcl of the transistor 8 can be expressed as follows:

$$Vcl = I6 \times R6 + VBE[I6+I7]$$

The transistor 8 turns on when the above-stated voltage Vc exceeds the value Vcl.

A constant current source 10 and transistors 11, 12 and 16 form a current Miller circuit. The transistor 9 receives a base current from the constant current source 7 and is arranged to render the transistors 11 and 12 of the current Miller circuit inoperative when the transistor 8 is off and operative when it is on.

Another current Miller circuit is formed by transistors 13, 14 and 15. The collector of the transistor 14 is connected to the positive terminal of the capacitor 5. The collector of the transistor 15 is connected to the base of the transistor 8. This current Miller circuit (13, 14 and 15) assumes an open state when the transistor 8 is off. When the transistor 8 is on, a predetermined constant current flows through this circuit to increase a charging current flowing to the capacitor 5 and to apply a base current to the transistor 8. This serves to turn the transistor 8 on without fail.

Transistors 17 and 18 also form a current Miller circuit. The base of the transistor 18 is connected to the collector of the transistor 16. The collector of the transistor 18 is connected to the base of a transistor 20 of a subsequent stage. This current Miller circuit (17 and 18) becomes inoperative when the transistor 8 is off. Then, the collector of the transistor 18 assumes an open state. When the transistor 8 is on, a predetermined current flows to the collector of the transistor 18. The transistor 20 then turns on. The output of the transistor 20 is inverted by a gate 53 and a first timing signal A is thus obtained.

Circuit elements 21–36 and elements 37–52 are arranged almost in the same manner as the circuit elements 6–20 which have been described above. They are arranged to generate respectively a second timing signal B and a third timing signal C. These timing signals A, B and C are arranged to be produced at a high level in a time serial manner one after another, in the order of signal A, signal B and signal C, with emitter resistors 24 and 40 added between the emitter of the transistor 23 and the ground GND and between that of the transistor 39 and the ground GND, or by virtue of the resistance values of base resistors 6, 21 and 37 or by virtue of the current values of constant current sources 7, 22 and 38.

A reference voltage generating circuit 59 is arranged to have a predetermined temperature coefficient and to generate a high level signal D in cooperation with a comparator 60 and a gate 61 when the battery voltage drops to a value below a predetermined level. A gate 62 is arranged to receive this signal D and a signal $\overline{B}$ which is obtained with the second timing signal B inverted. A latching circuit is formed by gates 63 and 64. The gate 64 is arranged to receive the first timing signal A. A gate 65 is arranged to have the output of the latching circuit (63 and 64) supplied to one input terminal thereof and the third timing signal C and also to have a signal E which is produced from the film winding completion detecting circuit 2 supplied to the other input terminal thereof via gates 67 and 68. Gates 53–56 and 61–70 form a logic circuit which controls the motor 101 to cause it to wind up the film, to come to a stop and to rewind the film according to the timing signals A, B and C, a signal D which is indicative of whether the battery voltage is above or below the predetermined value and the film winding completion signal E.

Circuit elements 71–75 and elements 76–80 respectively form current Miller circuits. The current Miller circuits (71–75 and 76–80) such the base currents of motor controlling PNP transistors 99 and 100 with constant currents which are N times as much as those of constant current sources 74 and 79. These circuits (71–75 and 76–80) are controlled by controlling the base potentials of transistors 71 and 76.

Circuit elements 81–86 and elements 87–92 form current Miller circuits in two stages. These circuits (81–86 and 87–92) are arranged to cause predetermined currents to flow to the bases of motor controlling NPN transistors 103 and 104. The circuits (81–86 and 87–92) are controlled through their transistors 81 and 87.

Another current Miller circuit which is composed of elements 93–98 is arranged to turn on a motor shortcircuiting transistor 102. This circuit (93–98) causes a current to flow to the base of the transistor 102 at the time of short-circuiting the motor.

Figure 2:
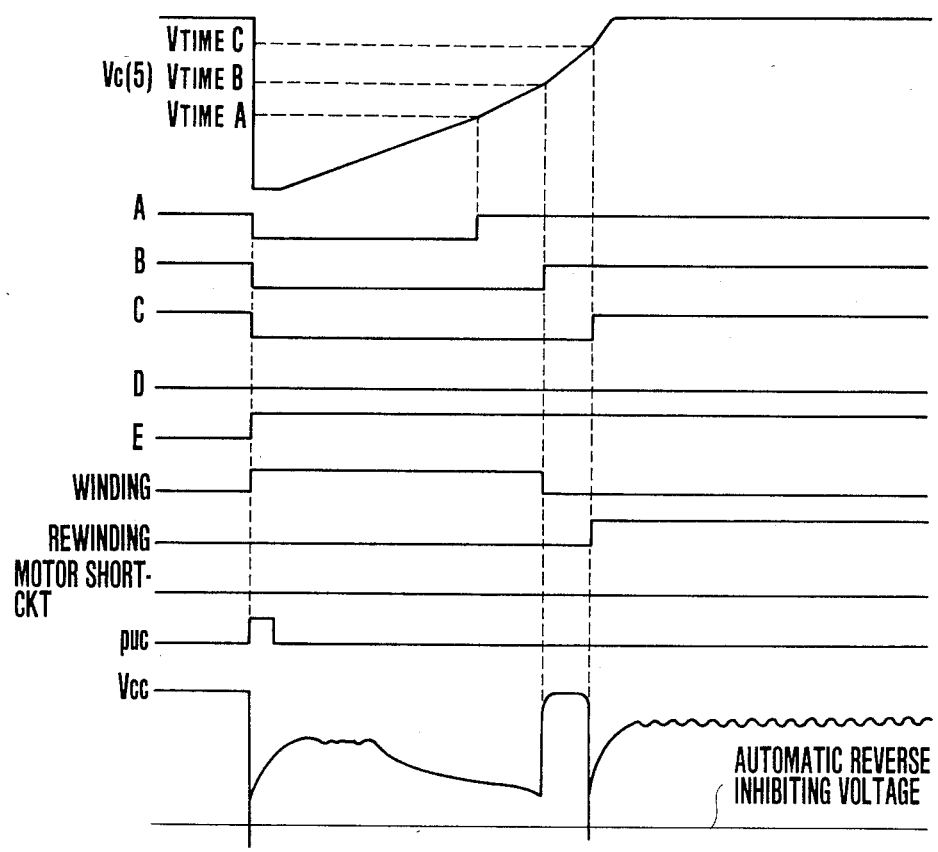
FIG. 2 is a timing chart showing the operations of various circuit elements of FIG. 1 performed at the time of automatic film rewinding.
Figure 3:
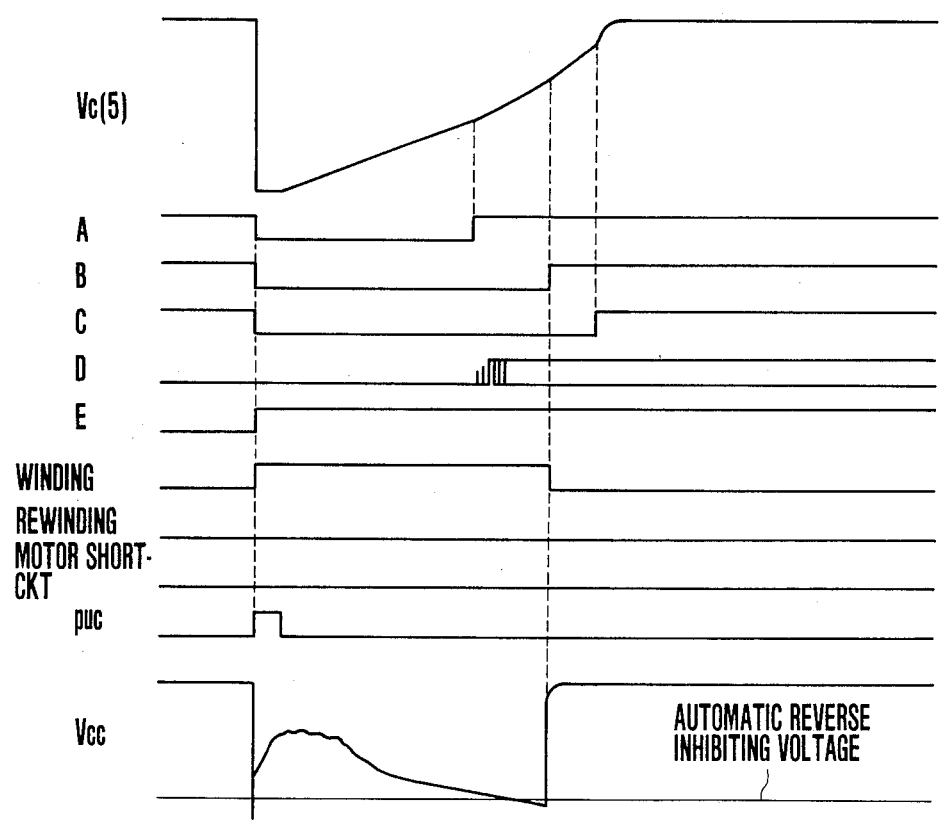
FIG. 3 is a timing chart showing the operations of various circuit elements of FIG. 1 performed when power supply to a motor 101 is to be switched off after the lapse of a predetermined period of time from detection of that a power supply voltage Vcc has become lower than a predetermined level.

The operation of the embodiment which is arranged as described above is described as follows with reference to FIGS. 2, 3 and 4, which are timing charts: FIG. 2 is a timing charts showing an automatic film rewinding operation of the embodiment which is performed when the power supply voltage Vcc is above a predetermined level. FIG. 3 shows the timing of an operation of the embodiment to be performed to cut off power supply to the motor 101 after the lapse of a predetermined length of time when the power supply voltage Vcc drops to a value below the predetermined level. FIG. 4 shows the timing of an operation of the embodiment to be performed to wind up one frame portion of film when the power supply voltage Vcc is above the predetermined level.

After completion of a series of photographing processes, the film winding completion detecting circuit 2 supplies the power-up-clear circuit 1 with a high level signal E which rises at the start of a film winding process. The power-up-clear circuit 1 produces a signal PUC, which turns the transistor 4 on. With the transistor 4 thus turned on, the capacitor 5 makes an initial discharge. Then, as shown in FIG. 2, the timing signals A, B and C are set at a low level. Since the timing signal A is thus at a low level, the latching circuit which is formed by NAND gates 63 and 64 is in a reset state irrespective of the condition of the output of the gate 62 which is a battery check determining signal. The output level of the gate 64 becomes high. This high level output of the gate 64 effectively prevents any erroneous operation even if the power supply voltage Vcc happens to suddenly change at the start of a film winding process. Further, since another input to the gate 65 is at a low level, the output level of the gate 65 becomes high. The high level output of the gate 65 turns off the current Miller circuits (76–80 and 87–92). Then, the motor driving transistors 100 and 103 turn off to prevent a current flow to the motor in the direction of film rewinding.

Meanwhile, the signal B is inverted into a high level by the gate 55. Then, the battery check determining signal which is another input to the gate 62 is produced as it is from the gate 62. The film winding completion signal E and the signal $\overline{B}$ which are inputs to the gate 70 are both at a high level. Therefore, the output level of the gate 70 becomes low. The low level output of the gate 70 causes the current Miller circuits which are formed by the elements 71–75 and elements 81–87 to turn on respectively. The motor driving transistors 99 and 104 turn on. Further, since the signal $\overline{B}$ is supplied to the gate 69 and since film winding has not been completed (with the signal E at a high level), the output level of the gate 69 becomes high. The current Miller circuit (93–98) turns off and the motor 101 is not short-circuited. In other words, in the initial state, the motor 101 has a current supplied thereto only in the film winding direction. No motor short-circuit is made and no initial battery check determining signal has been latched.

The capacitor 5 is charged in a linear manner by the constant current source 3. When the voltage Vc of the capacitor comes to exceed a threshold level, a timing signal is produced. Assuming that the voltages at which the timing signals A, B and C becomes high levels are respectively VtimeA, VtimeB and VtimeC, these high level voltages can be expressed respectively as follows:

VtimeA = I6 R6 + VBE [I6 + I7]

VtimeB = I21 T21 + I22 R24 + VBE [I21 + I22]

VtimeC = I37 R37 + I38 R40 + VBE [I37 + I38]

Then, resistance values and currnt values are set in such a way as to have the following relation: VtimeA < VtimeB < VtimeC.

With the voltage Vc of the capacitor 5 coming to exceed the voltage VtimeA, the transistor 8 turns on and the transistor 9 off. The current Miller circuit (11–18) operates to make the level of the timing signal A high. Then, the current Miller circuit formed by the transistors 13, 14 and 15 serves either to prevent voltage variations or to have the next timing signal produced. Therefore, a new constant current is supplied to the capacitor 5. With the level of the signal A becoming high, the latching circuit composed of the gates 63 and 64 are released from a reset state. After that, the battery voltage determining signal can be latched until the level of the signal B becomes high.

When the voltage Vc comes to exceed the voltage VtimeB, the level of the signal B becomes high in the same manner as in the case of the timing signal A. The timing signal B is inverted into a signal $\overline{B}$ by the gate 55. The inverted signal $\overline{B}$ is supplied to one of the input terminals of the gate 62. Then, irrespective of the state of the battery voltage determining signal which is supplied to the other input terminal of the gate 62, the level of the output of the gate 62 becomes high. After that, the latching circuit (63 and 64) is never set by battery voltage determining information received thereafter. In other words, the battery voltage determining information is set at the latching circuit (63 and 64) only during a period after the timing signal A is produced at a high level and before the timing signal B is produced at a high level. The inverted signal $\overline{B}$ is supplied to the gate 70. The gate 70 turns off the current Miller circuits (71–75 and 81–86) which have turned on the transistors 99 and 104 which cause a current flow to the motor in the film winding direction. As a result of this, the film winding process comes to a stop.

When the voltage Vc of the capacitor 5 comes to exceed the voltage VtimeC, the level of the timing signal C becomes a high level in the same manner as in the cases of other timing signals A and B. The signal C is inverted by the gates 67 and 68 before it is supplied to one of the input terminals of the gate 65. Since this input is at a high level, the level of the output of this gate 65 becomes either low (an automatic reverse signal of FIG. 2) or high (an automatic reverse inhibiting signal of FIG. 3) according to the latched information. In the event of the low level, the current Miller circuits (76–80 and 87–92) operate to turn on the rewinding power supply transistors 100 and 103. The motor then begins to rewind the film. If the output of the gate 65 is at a high level, the current Miller circuits (76–80 and 87–92) are off. Accordingly, the film is neither wound up nor rewound as shown in FIG. 3.

When one frame portion of the film is wound up with the film not having been used up for photographing, the signal E of the film winding completion detecting circuit 2 changes from a high level to a low level before the level of the timing signal B becomes high as shown in FIG. 4. In this case, the output levels of the gates 67 and 70 become high irrespective of information supplied to other input terminals of them. This turns off the current Miller circuits (71–75 and 81–86) which have been keeping the film winding power supply transistors 99 and 104 operative. The rewinding power supply current Miller circuit (76–80 and 87–92) are likewise turned off. Further, during a period after completion of film winding and before the level of the timing signal B becomes high, the signal $\overline{E}$ which is obtained through inversion by the gate 66 and the timing signal $\overline{B}$ cause the current Miller circuit (93–98) to turn the motor short-circuiting transistor 102 on. Then, the motor 102 is short-circuited.

In this embodiment, the timer circuit is basically arranged to be operatable until the power supply voltage become a value VBE + VCE. With a suitable constant current circuit and a logic circuit employed, the timer circuit is operable even at a low voltage. As for the timing signals A, B and C, they can be arranged to have stable time differences between them by appositely setting various resistance values and the hysteresis current values of their timing circuits.

Further, the embodiment is arranged to have three different timing signals. However, a greater number of timing signals may be used for accomplishing additional functions as desired. In the embodiment, an analog circuit is arranged to perform a battery check during a period from a point of time when film winding process becomes stable after start of it until the time of automatic reversing. The invention is not limited to this arrangement. In cases where a low voltage operation does not have to be taken into consideration, a digital circuit may be arranged to operate for a similar battery checking operation period.

The invention gives accurate battery check information with the battery check accomplished after stabilization of a film winding process following commencement of film winding and before an automatic reversing process as mentioned above. Further, according to the invention, a plurality of timing signals are obtainable with relatively small scaled and simple circuit arrangement and a motor drive control circuit capable of operating within a voltage range down to a low voltage can be obtained.

What is claimed is:

1. A motor drive control circuit for a camera, comprising:
   a motor for feeding a film;
   a timer for time counting for a predetermined period of time from a certain point of time after commencement of a driving operation of the motor;
   comparison means for comparing a power supply voltage with a reference voltage during the time counting process of said timer, said comparison means being arranged to generate an operation signal when said power supply voltage is above said reference voltage and to generate an inhibiting signal when the power supply voltage is below the reference voltage; and
   holding means for holding the output signal produced from said comparison means, said holding means being arranged to permit a further operation of the camera when it holds said operation signal and to inhibit the further operation of the camera when it holds said inhibiting signal.

2. A circuit according to claim 1, wherein said holding means is allowed to hold said signal over a period after commencement of the driving operation of said motor and before the driving operation comes to a stop.

3. A circuit according to claim 2, wherein said point of time at which said timer begins to count time is a point-of time at which a film feeding process becomes stable after commencement thereof.

4. A circuit according to claim 1, further comprising reset means for resetting said holding means for a period from commencement of the driving operation of the motor to a certain point of time after the commencement of said driving operation.

5. A circuit according to claim 4, wherein said timer is arranged to generate a plurality of timing signals including at least signals for releasing the reset action of said reset means and for bringing the film feeding operation of said motor to a stop.

6. A circuit according to claim 5, wherein said timer includes means having a plurality of threshold levels for forming a plurality of timing signals.

7. A motor control circuit, comprising:
   a motor;
   a timer arranged to count a predetermined length of time;
   comparison means for comparing a power supply voltage with a reference voltage during the time counting process of said timer, said comparison means being arranged to generate an operation signal when said power supply voltage is above said reference voltage and to generate an inhibiting signal when the power supply voltage is below the reference voltage; and
   holding means for holding the output signal produced from said comparison means, said holding means being arranged to permit the driving operation of said motor to be further performed when said holding means holds said operation signal and to inhibit the driving operation of the motor thereafter when said holding means holds said inhibiting signal.

* * * * *

UNITED STATES PATENT AND TRADEMARK OFFICE
CERTIFICATE OF CORRECTION

PATENT NO. : 4,550,992
DATED : November 5, 1985
INVENTOR(S) : Masanori Ohtsuka, et al It is certified that error appears in the above-identified patent and that said Letters Patent is hereby corrected as shown below:

In the heading of the Patent, it should read:

--[30]  Foreign Application Priority Data

Dec. 9, 1984 [JP]    Japan ............58-231 559 --

Signed and Sealed this

Twenty-ninth Day of July 1986

[SEAL]

Attest:

DONALD J. QUIGG

Attesting Officer

Commissioner of Patents and Trademarks